United States Patent [19]

Kreider et al.

[11] Patent Number: 4,640,963
[45] Date of Patent: Feb. 3, 1987

[54] METHOD AND APPARATUS FOR RECYCLE OF ENTRAINED SOLIDS IN OFF-GAS FROM A GAS-PHASE POLYOLEFIN REACTOR

[75] Inventors: David R. Kreider, Wheaton, Ill.; Albert McCullum, Friendswood, Tex.; Philip M. Rose, Naperville; Chi-Hung Lin, Wheaton, both of Ill.

[73] Assignee: Standard Oil Company (Indiana), Chicago, Ill.

[21] Appl. No.: 702,007

[22] Filed: Feb. 15, 1985

[51] Int. Cl.$^4$ .............................................. C08F 2/34
[52] U.S. Cl. ........................................ 526/67; 526/68
[58] Field of Search ................................. 526/67, 68

[56] References Cited

U.S. PATENT DOCUMENTS

| | | | |
|---|---|---|---|
| 3,816,383 | 6/1974 | Stotko | 526/67 |
| 3,957,448 | 5/1976 | Shepard | 526/67 |
| 3,965,083 | 6/1976 | Jezl | 526/67 |
| 4,014,859 | 3/1977 | Cooper | 526/67 |
| 4,101,289 | 7/1978 | Jezl | 526/67 |

*Primary Examiner*—Paul R. Michl

[57] ABSTRACT

In a process for quench-cooled, vapor-phase polymerization of olefin monomer comprising (a) contacting an olefin monomer, or mixture of olefin monomers, with a polymerization catalyst in the presence of hydrogen in a reactor vessel to form polymer product, and (b) removing, condensing and recycling off-gas from such reactor, an improvement comprises separating entrained polymerizing solid fines from said off-gas and recycling such solids directly to the reactor without substantial continued polymerization of such solids while in the presence of a substantially different concentration of hydrogen than in the reactor.

14 Claims, 3 Drawing Figures

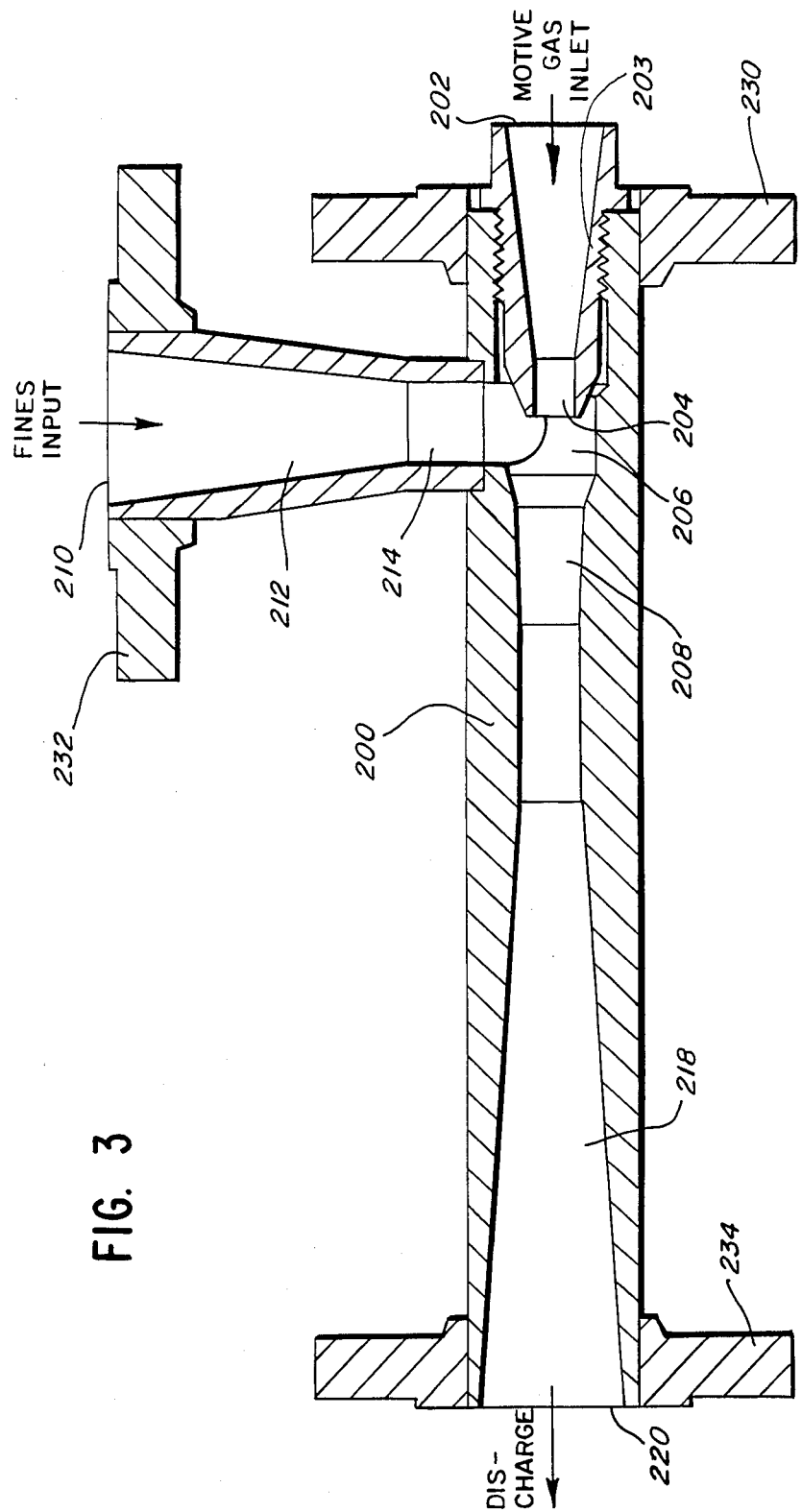

METHOD AND APPARATUS FOR RECYCLE OF ENTRAINED SOLIDS IN OFF-GAS FROM A GAS-PHASE POLYOLEFIN REACTOR

BACKGROUND OF THE INVENTION

This invention relates to a process for vapor phase polymerization of monomers in a vapor-phase, quench-cooled reactor vessel in which off-gas from the reactor vessel is recycled. More specifically, this invention relates to a method and apparatus for recovering and recycling entrained solids (sometimes referred to as "fines") which are undersized particles of polymer product and solid catalyst particles from the off-gas from the reactor vessel.

Vapor phase polymerization processes using vapor-phase, quench-cooled reactor vessels have been described in U.S. Pat. Nos. including 3,652,527; 3,957,448; 3,965,083; 3,970,611; 3,971,768; 4,003,712; 4,101,289; 4,129,701; 4,130,699; 4,337,069; and 4,372,919 and Reissue Pat. No. 30,148, all incorporated by reference herein. These references describe polymerization processes and apparatuses in which polymer is formed from gaseous monomer in horizontal/stirred bed, vertical/-stirred bed or fluidized bed reactor vessels. Typically, in operation of such processes and apparatuses, particles of polymer are formed around solid catalyst particles. Typically, polymer power particles are formed in a particle size distribution mirroring the distribution of the solid catalyst particles used in the process. Thus, depending upon the particle size distribution of solid catalyst particles, more or fewer small polymer particles are formed. Very small polymer particles (typically about 5 to 600 microns in average diameter) cause problems in the overall polymerization process by being entrained in various parts of monomer or recycle gas transfer lines. Such small polymer particles tend to react in the condenser/scrubber system of the process in which off-gas is partially condensed to a liquid which is recycled to the reactor as quench liquid, resulting in high molecular weight particles which form a hard sludge-like buildup which can clog various pipes, conduits, vessels, outlets and nozzles of the apparatus used in the process. As a result, the polymerization process must be shut down for cleaning.

Another problem associated with entrained solids in the recycle quench liquid is that these particles have a higher molecular weight than polymer normally formed in the reactor. This is due to a low concentration of molecular weight control agent such as hydrogen in the condensed recycle liquid where such entrained polymer particles are forming. When these high molecular weight particles are recycled to the main reactor and are mixed with normal polymer product, such high molecular weight (low melt flow) polymer contaminates the normal product polymer exiting the reactor vessel and appear as specks in polymer films made from such mixed polymer product.

If the entrained solids are removed by screening various transfer lines, a substantial amount of polymer (0.1 to 5 wt. % of total polymer production) is wasted.

This invention describes a method and apparatus to remove entrained solids from the reactor off-gas without permitting substantial continued polymerization of such fines, and recycling the fines directly to the reactor vessel.

Although the art describes polymerization apparatus and processes generally useful for this invention, including U.S. Pat. No. 4,372,919 which discloses a horizontal bed paddle wheel agitator, vapor phase polymerization process in which fines are separated from an off-gas by a cyclone, this invention is directed to a method and apparatus by which fines can be recycled directly to a reactor without undergoing undesirable continued polymerization outside the reactor vessel in the presence of a substantially different hydrogen concentration than in the reactor. It has been found in practice that return of polymer fines directly to a reactor from a cyclone typically is not feasible because there is insufficient motive force to transport the fines particles. This invention provides a means to transport fines directly into a reactor.

SUMMARY OF THE INVENTION

In a process for quench-cooled, vapor-phase polymerization of olefin monomer comprising (a) contacting an olefin monomer, or mixture of olefin monomers, with a polymerization catalyst in the presence of hydrogen in a reactor vessel to form polymer product, and (b) removing, condensing and recycling off-gas from such reactor, an improvement comprises separating entrained polymerizing solid fines from said off-gas and recycling such solids directly to the reactor without substantial continued polymerization of such solids while in the presence of a substantially different concentration of hydrogen than in the reactor.

BRIEF DESCRIPTION OF THE DRAWINGS

FIG. 3 is a detailed drawing of another embodiment of an eductor means used in this invention.

BRIEF DESCRIPTION OF THE INVENTION

Figure 1:
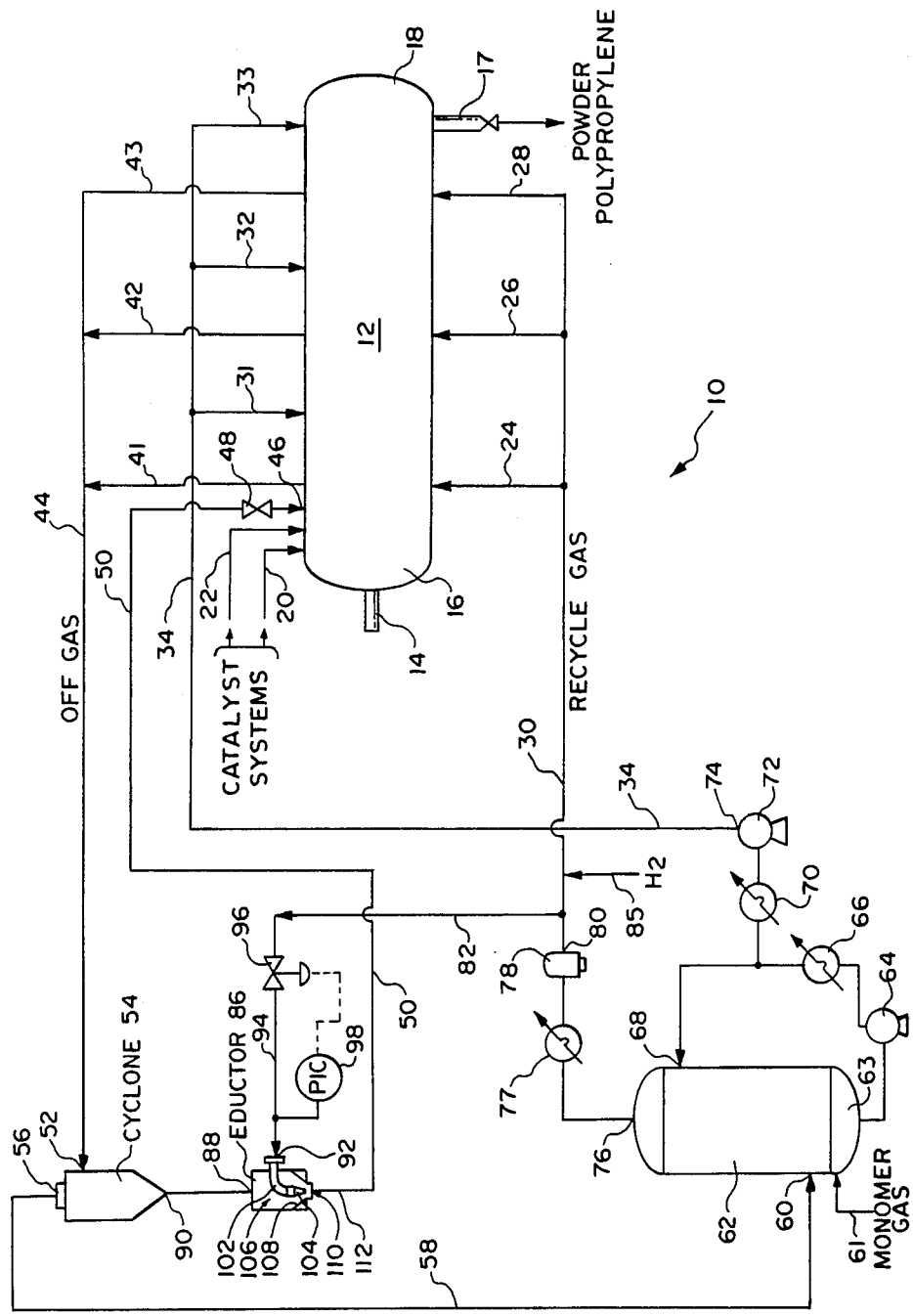
FIG. 1 shows a quench-cooled, vapor-phase olefin polymerization apparatus which contains an eductor means used to recycle fines directly to a polymerization reactor.

Gas-phase or vapor phase olefin polymerization reactor systems in which the present invention is useful comprise an agitated reactor vessel to which olefin monomer and catalyst components can be added and which contain a bed of forming polymer particles which are agitated by a mechanical agitator. Typically, catalyst/cocatalyst components are added together or separately through one or more valve controlled ports in the reactor vessel. Olefin monomer, typically, is provided to the reactor through a recycled gas and quench liquid system in which unreacted monomer is removed as off-gas, partially condensed and mixed with fresh feed monomer, and injected into the reactor vessel. Typically, hydrogen is added to control molecular weight.

A quench liquid is added to polymerizing olefin in order to control temperature. In propylene polymerization, the quench liquid can be liquid propylene. In other olefin polymerization reactions, quench liquid can be a liquid hydrocarbon such as propane, butane, pentane or hexane, preferably isobutane or isopentane. Depending on the specific reactor system used quench liquid can be injected into the reactor vessel above or within the bed of polymer particles.

In the process of this invention, polymerizing fines including polymer fines and entrained solid catalyst particles, are separated and recycled to a vapor-phase olefin polymerization reactor. In this process olefin polymer is formed by contact with a suitable polymerization catalyst in a quench-cooled, vapor-phase reactor from which off-gas is collected, condensed and recycled to the reactor. If polymer fines in such off-gas are transported though such off-gas condensation and recycle phase, typically, polymer continues to form around such fines. Because such newly-formed polymer is produced at a location which does not contain substantially the same hydrogen concentration as the reactor, the resulting polymer has a different molecular weight, as measured by melt flow rate, than polymer formed in the reactor. The process of this invention eliminates this problem and permits return of such polymer fines directly to the reactor.

In the process of this invention, polymer fines and any entrained catalyst particles are separated from the off-gas, typically in a cyclone. It has been found that direct transfer of separated fines form such a cyclone to a reactor is not feasible as noted above. In this invention scrubbed reactor off-gas is used as a motive gas in an eductor coupled to such cyclone to provide sufficient motive force to return the polymer fines to the reactor. Although the scrubbed off-gas may have a higher hydrogen concentration than in the reactor, typically, the returned polymer fines are in contact with this gas for such a short time that any polymer which is returned to the reactor will have substantially the same molecular weight as the polymer formed in the reactor.

A specific design for the apparatus and process of this invention, of course, depends on the specific vapor-phase polymerization system used. In one polymerization system useful in this invention, pressure in the cyclone is about 5 psi lower than in the reactor. If the motive supply pressure were about 25 psi more than the reactor pressure, fines can be educted from a pressure sufficient to permit a sufficient pressure drop for conveying fines back to the reactor. A pressure drop of about 5 psi typically is sufficient. As can be appreciated by those skilled in the art, reasonable variations of such values can be useful.

The invention described herein can be illustrated further by reference to the drawings. FIG. 1 illustrates schematically a horizontal, quench-cooled apparatus 10 for vapor phase polymerization of olefin monomers, which includes a reactor vessel 12 which has a shaft 14 extending out one end 16 of vessel 12. Shaft 14 is connected to a mechanical agitator (hidden from view) situated within the reactor vessel 12. The mechanical agitator can include paddle wheel-type blades, helically arranged blades or a combination thereof for mixing the components of the vessel and for moving, or causing movement of, polymer powder product produced in the vessel to an output 17 at the output end 18 of vessel 12.

Catalyst/cocatalyst components are supplied to vessel 12 through first and second input lines 20 and 22. For example, solid, titanium-containing catalyst component, such as titanium trichloride, in a diluent such as hexane or liquid monomer is fed into line 20. Cocatalyst, such as an aluminum alkyl together with modifier compounds in a diluent or solvent such as hexane, is fed into line 22. Other comonomers also may be fed into the reactor.

In addition to the catalyst input lines 20 and 22, vessel 12 has gas input lines such as lines 24, 26 and 28 supplied by a gas line (pipe or conduit) 30 through which fresh monomer gas and recycle gas pass, quench liquid input lines such as lines 31, 32 and 33 supplied by quench line 34, and off-gas output lines such as lines 41, 42 and 43 coupled to an off-gas output line 44.

In accordance with the teachings of this invention, reactor vessel 12 is equipped with a fines (entrained solids) return input 46 which is coupled through valve 48 to a fines/scrub-gas return line 50. Valve 48 is closed during start-up of polymerization and is opened when a desired pressure is established in fines/scrub-gas return line 50.

As shown, the off-gas line 44 is fed to an input 52 of a cyclone 54 where fines entrained in the off-gas are separated and the separated off-gas exits from a cyclone gas output 56 to a separated off-gas line 58 which is connected to a lower input 60 of condenser/scrubber 62. A suitable condenser/scrubber is described in U.S. Pat. No. 4,337,069.

The condenser/scrubber contains a supply of quench liquid such as liquid propylene at the bottom thereof. From the bottom 63 of condenser/scrubber 62, quench liquid is withdrawn and pumped by pump 64 through heat exchanger 66 to an upper input 68 of condenser/scrubber 62. Fresh monomer can be added through input line 61 to the off-gas scrubber, or alternatively, may be added to the liquid recycle or to the reactor directly through additional ports (not shown).

A spray of quench liquid from the upper input 68 into condenser/scrubber 62 serves to condense and scrub separated off-gas flowing upwardly from the bottom 63 of the condenser/scrubber 62. This causes cleaning of any remaining particles (which should be few) in the separated off-gas and condensing of any vaporized quench liquid that may be present in the separated off-gas. The scrubbed off-gas typically would be substantially free of fines.

As shown, some of the condensed quench liquid exiting the heat exchanger 66 also is supplied through another heat exchanger 70 to a pump 72 having an output 74 connected to the quench liquid supply line 34 leading to inputs 31, 31 and 33.

Scrubbed off-gas exits from a top outlet 76 of condenser/scrubber 62 and passes through a heat exchanger 77 and blower 78 which has an output 80 connected to gas supply (or recycled gas supply) line 30.

A portion of the stream of scrubbed off-gas from blower 78 in the recycled gas supply line 30 is removed by take-off line 82 leading to a fines return circuit. Downstream from the take-off line 82, hydrogen gas input line 85 is connected to gas supply line 30 for supplying fresh hydrogen to the reactor.

As shown, the fines return circuit includes an eductor 86 having one input 88 vertically beneath and coupled to a lower outlet 90 of cyclone 54, where fines are separated from the off-gas. The eductor 86 has a nozzle input 92 coupled to a gas stream input line 94 which in turn is coupled through valve 96 to take-off line 82. Line 94 supplies the motive gas to the eductor. Valve 96 controls the amount, velocity and pressure of the separated, scrubbed gas stream supplied to eductor 86 from take-off line 82. Valve 96 is controlled by pressure controller 98. Optionally, a motive gas pressure can be installed to increase the motive gas pressure.

Eductor input 92 is connected to an elbow- or L-shaped pipe or tubing 102 which has nozzle 104 at a lower outlet thereof within a chamber 106 in eductor 86. A conical formation 108 is situated in the lower portion of chamber 106 beneath and coaxial with nozzle 104 forming an eductive chamber 109 (see FIG. 2.). The nozzle is aimed to eject gas into the center of an outlet from the conical formation 108 to entrain fines coming into eductive chamber 19 and to transport such entrained gas through outlet 110 from conical formation 108 and is coupled to an input 112 of fines return line 50. Thus the gas stream or jet is ejected from nozzle 104 into the fines return line. In this way, fines are separated from the off-gas and returned directly to reactor vessel 12 without substantial additional high molecular weight polymer forming around such fines particles.

Figure 2:
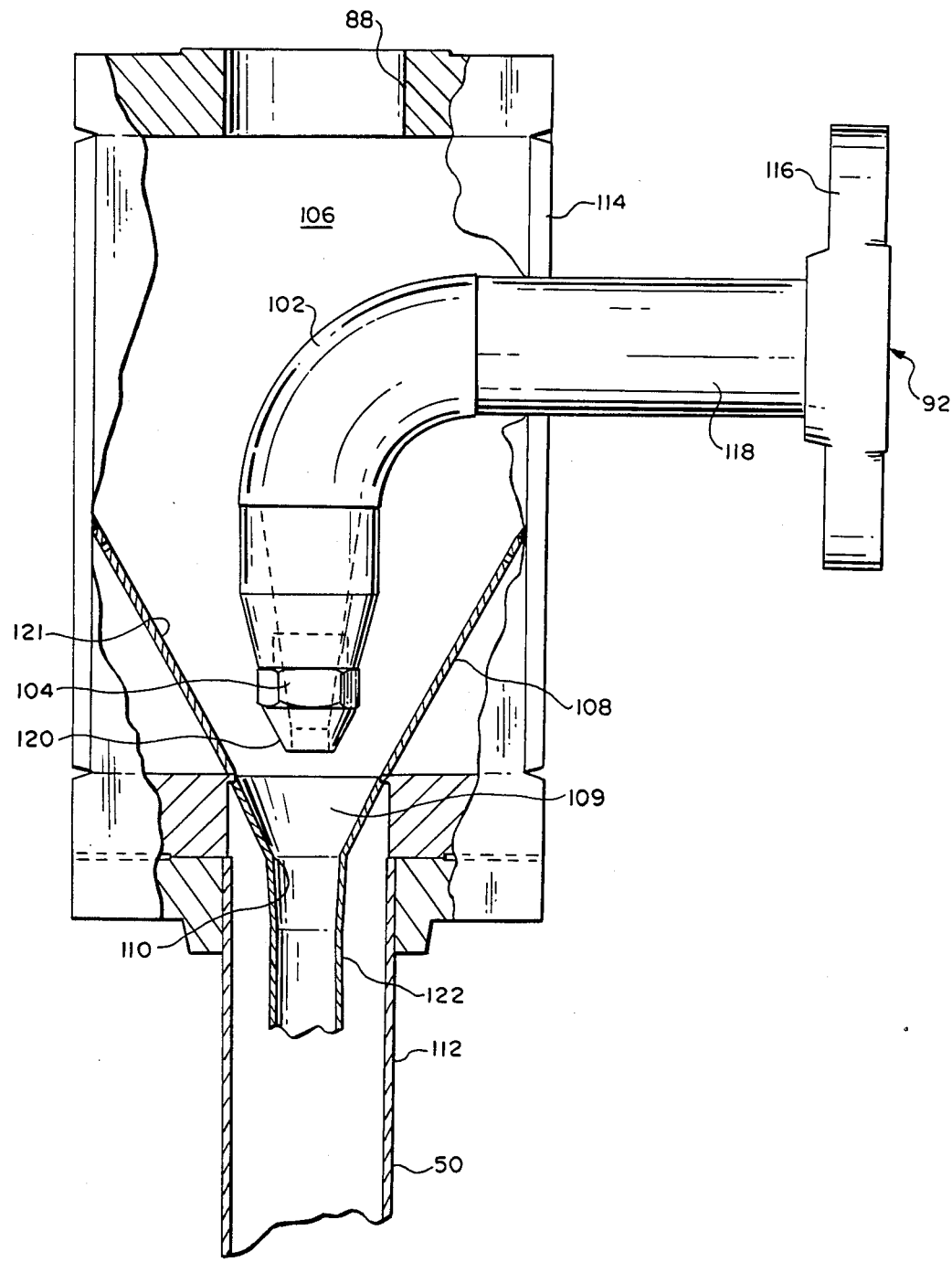
FIG. 2 is a detailed drawing of one embodiment of an eductor means used in this invention.

Eductor 86 is illustrated in more detail in FIG. 2 which shows eductor 86 including cylindrical body 114 having inlet opening 88 which is coupled to lower outlet 90 of cyclone 54.

Flange 116 having input 92 to eductor 86 is adapted to be coupled to gas stream inlet line 94. Coupled to flange 116 is a straight section of pipe 118 which extends into the cylindrical eductor body or housing 114 at the lower end thereof. Nozzle 104 is spaced a predetermined distance outwardly from the conical formation 108. As shown, nozzle 104 has a conical surface 120 which is parallel to the inner conical surface 121 of conical formation 108.

Also, in accordance with this invention, the conical formation 108 has a slope of between about 5 and 30 degrees to the axis of conical formation 108. At the bottom opening 110 of the conical formation is a short section of tubing 122 which extends into the larger-in-diameter inlet pipe section 112 of the fines return line 50 fixed to the lower end of eductor 86.

Eductor 86 may be located in a generally vertical position so that fines can be assisted by gravity to flow from the cyclone 54 to eductor 86 and are easily entrained in the portion of separated and scrubbed off-gas exiting from nozzle 104 of eductor 86.

The size and configuration of the eductor depend of such factors as reactor pressure and the amount and size of fines carried over. For example, the distance between the conical surface 120 or nozzle 104 and the conical formation 108 is between about one-half and about one and one-half inches and preferably is about three-fourths of an inch. These dimensions can be altered depending upon the overall size and production capacity of the polymerization process in which this apparatus of this invention is included.

An alternate, and in some instances preferable, eductor design is shown in FIG. 3. It is contemplated that this eductor 200 may replace eductor 86 as shown in FIG. 1. Of course, minor line or conduit modifications must be made to adapt eductor 200 in place of eductor 86 as shown. Eductor 200 has nozzle input 202 connected by flange 230 through line 94 and valve 96 to the motive gas supply as indicated above.

Eductor input 202 is connected to conduit 203 which has a nozzle at the end thereof positioned within eductive chamber 206 aimed to eject motive gas into discharge conduit 208. Inlet opening 210 is coupled by flange 232 to lower outlet 90 of cyclone 54 so that separated fines may be drawn with eductive gas through conduit 212 into eductive chamber 206. Polymerizing fines, including polymer fines and solid catalyst particles are drawn from conduit 212 and transported by motive gas through a discharge conduit having a portion 208 of smaller cross-section adjacent to eductive chamber 206 and a portion of larger cross-section 218 adjacent to discharge outlet 220 which is coupled by flange 234 to fines/scrub-gas return line 50.

As used herein an eductive chamber in an eductor is a space in which motive gas contacts input eductive material and from which educted material is discharged. Generally, a suitable eductor used in this invention comprises an eductive chamber which is connected to an eductive material (e.g., gas-entrained separated fines) input, a discharge conduit and a motive gas nozzle. Typically, the discharge conduit is smaller in cross-section adjacent to the eductive chamber than to the outlet of such conduit. Thus, educted gas will have a higher velocity nearer the eductive chamber. The nozzle is positioned to aim motive gas towards the discharge conduit. A suitable eductor is designed to avoid dead space in which polymer can build up. For example, in eductor 200, nozzle 204 should not extend excessively into the eductive chamber so as to provide a space under the nozzle and above the bottom of the eductive chamber.

In operation of apparatus 10 for vapor phase polymerization of monomers in reactor vessel 12, recycled monomer gas and hydrogen are supplied to vessel 12 at a velocity and pressure sufficient to maintain a reactor pressure of about 200 to 400 psig while catalyst components and monomer are supplied to the reactor vessel. Further, the exothermic polymerization reaction is cooled through a quench liquid as described previously. Off-gas comprises monomer gas, hydrogen, vaporized quench liquid (which may be monomer), vaporized diluent (if any) and fines. A typical eductor useful in the process and apparatus of this invention is manufactured by Croll-Reynolds and is capable of handling up to about 4000 to 6000 pounds per hour of recycled gas at 325 psig and discharges fines from the cyclone at about 295 psig to the eductor.

The pressure difference between the outlet pressure from cyclone 54 and the pressure of the motive gas stream from the eductor nozzle typically is between about 5 and 80 psi so that with a discharge of fines from cyclone at about 295 psig, the pressure of the gas stream will be between about 300 and 380 psig. The gas-stream velocity exiting eductor nozzle 104 or 204 typically is between about 10 to about 40 feet per second and preferably is about 15 to 30 feet per second.

Pressure controller 98 and valve 96 are used to maintain pressure of the gas stream. Typically, this pressure is maintained at about 250 to 400 psig and preferably is maintained at about 300 to 380 psig. The pressure of the off-gas containing entrained fines in line 50 typically is about 300 psig. Typically, the eductive gas is about one-fourth to one-half and preferably about one-third of the motive gas.

Polyolefins produced in a gas-phase olefin polymerization system using this invention include polymers of alphaolefins and substituted alphaolefins, ethylene polymer, propylene polymer, copolymers of ethylene and propylene, and copolymers of ethylene or propylene with other copolymerizeable alphaolefins.

Typically, polyolefins made in a process of this invention are formed by contacting an olefin monomer or a mixture of olefin monomers with a polymerization catalyst system comprising a transition metal compound component and an organoaluminum compound component. In addition, minor amounts of catalyst modifiers known to the art can be incorporated within or added to such catalyst system.

Transition metal compounds useful as a catalyst system component usually are compounds of Groups IVB, VB, and VIB of the Periodic Table. Preferably, the transition metal compound is a solid titanium-containing compound such as a titanium halide. Most preferable for propylene polymerization is a titanium trichloride and especially a titanium trichloride which has been activated by chemical or physical means. Such activated titanium trichlorides may be made by forming adducts with Lewis bases such as ethers or by supporting a titanium trichloride on a metal oxide or salt. Other suitable transition metal compounds are halides, oxyhalides, alkyloxyhalides, aryloxyhalides, alkoxides or aryloxides of a Group IVB or VB transition metal such as vanadium, zirconium or, preferably, titanium. Preferable compounds for ethylene polymerization include titanium tetrachloride, titanium tetrabromide, butoxytitanium trichloride, dibutoxytitanium dichloride, tetrabutyl titanate, vanadium tetrachloride and zirconium tetrachloride. Also useful are supported and unsupported Group VIB oxides, such as chromia or chromia on silica.

Useful organoaluminum compounds include trialkylaluminum, dialkyaluminum halides, mixtures of trialkylaluminum with dialkyaluminum halides and mixtures of trialkyaluminum with alkylaluminum dihalides. Also catalytically effective amounts of mixtures of trialkylaluminum and dialkylaluminumhalides can be used in conjunction with alkylaluminum dihalides. Useful halides include bromides and chlorides and useful alkyl radicals contain from two to about six carbon atoms. The preferable halide is chloride and the preferable alkyl radical is ethyl. Triethylaluminum, triisobutylaluminum, diethylaluminum chloride and mixtures thereof are preferred.

The foregoing description of this invention illustrates but does not limit the invention taught and claimed herein.

What is claimed is:

1. In a process for quench-cooled, vapor-phase polymerization of olefin monomer comprising (a) contacting an olefin monomer, or mixture of olefin monomers, with a polymerization catalyst in the presence of hydrogen in a reactor vessel to form polymer product, and (b) removing, condensing and recycling off-gas from such reactor, the improvement comprising separating entrained polymerizing solid fines from said off-gas and recycling such solids directly to the reactor without substantial continued polymerization of such solids while in the presence of a substantially different concentration of hydrogen than in the reactor.

2. The process of claim 1 wherein the reactor vessel is a stirred-bed reactor.

3. The process of claim 1 wherein the reactor vessel is a fluidized bed reactor.

4. The process of claim 1 wherein entrained polymer fines and solid catalyst particles are separated from the off-gas by a cyclone.

5. The process of claim 4 wherein scrubbed off-gas is used as a motive gas through an eductor to entrain separated polymer fines in such scrubbed off-gas and return such entrained fines to the reactor.

6. The process of claim 5 wherein said eductor comprises (i) an eductive chamber; (ii) an inlet conduit with an opening at one end through which separated fines may enter and joined at the other end to the eductive chamber; (iii) a discharge conduit with an inlet end and an outlet end, the inlet end joined to the eductive chamber and the outlet end joined to a fines return line to the reactor, the inlet end having a smaller cross-section than the outlet end; and (iv) a motive gas nozzle opening into the eductive chamber and aimed towards the discharge conduit.

7. The process of claim 6 wherein said eductor comprises a generally cylindrical body with a cylindrical chamber therein, an opening at the top of said body through which separated fines may enter, a conical formation in the lower portion of such cylindrical body with an opening at the bottom thereof into a larger-in-cross-section conduit, and a gas stream nozzle which is spaced above the bottom opening of said conical formation and which has an inlet end coupled to a motive gas stream.

8. The process of claim 6 wherein the pressure differential between the pressure at the bottom of the cyclone and the pressure of the motive gas stream at the nozzle in the eductor is between about 5 and 80 psig.

9. The process of claim 1 wherein the olefin monomer is ethylene, propylene, butene or a mixture thereof.

10. The process of claim 1 wherein the olefin monomer is propylene of a mixture or propylene and a minor amount of a copolymerizable alpha-olefin.

11. In a process for quench-cooled, vapor-phase polymerization of propylene or a mixture of propylene and a copolymerizable alpha-olefin comprising (a) contacting such olefin with a polymerization catalyst in the presence of hydrogen in a horizontal, stirred-bed reactor to form polymer product, and (b) removing, condensing and recycling off-gas from such reactor, the improvement comprising separating entrained polymerizing solid fines from said off-gas by a cyclone, transferring such separated fines to an eductor, entraining separated fines in the eductor with a motive gas essentially free of solids and returning such entrained fines from the eductor directly to the reactor without substantial continued polymerization of such solids while in the presence of a substantially different concentration of hydrogen than in the reactor.

12. The process of claim 11 wherein said eductor comprises (i) an eductive chamber; (ii) an inlet conduit with an opening at one end through which separated fines may enter and joined at the other end to the eductive chamber; (iii) a discharge conduit with an inlet end and an outlet end, the inlet end joined to the eductive chamber and the outlet end joined to a fines return line to the reactor, the inlet end having a smaller cross-section than the outlet end; and (iv) a motive gas nzozle opening into the eductive chamber and aimed towards the discharge conduit.

13. The process of claim 12 wherein said eductor comprises a generally cylindrical body with a cylindrical chamber therein, an opening at the top of said body through which separated fines may enter, a conical formation in the lower portion of such cylindrical body with an opening at the bottom thereof into a larger-in-crosssection conduit, and a gas stream nozzle which is spaced above the bottom opening of said conical formation and which has an inlet end coupled to a motive gas stream and wherein the conical formation inside said coaxial cylindrical body has a slope to the axis of the conical formation of between about five and thirty degrees and wherein the pressure differential between the pressure at the bottom of the cyclone and the pressure of the motive gas stream at the nozzle in the eductor is between about 5 and 80 psig.

14. The process of claim 12 wherein scrubbed off-gas is used as a motive gas through an eductor to entrain separated polymer fines and solid catalyst particles in such scrubbed off-gas and return such entrained fines to the reactor.

* * * * *